Sept. 8, 1964
T. V. DE PALMA
3,148,036
EXHAUST GAS CONVERTER
Filed Sept. 28, 1961
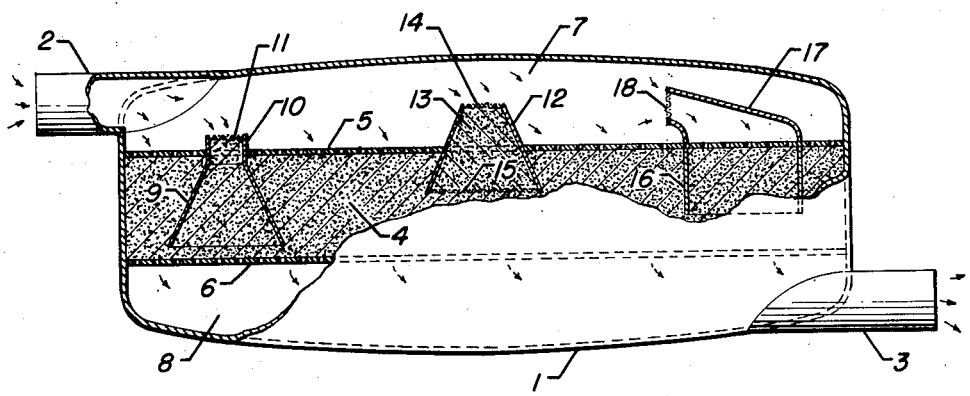
INVENTOR:
Ted V. DePalma
BY:
Chester J. Giuliani
Philip T. Liggett
ATTORNEYS

2

United States Patent Office 3,148,036
Patented Sept. 8, 1964

3,148,036
EXHAUST GAS CONVERTER
Ted V. De Palma, Roselle, Ill., assignor to Universal Oil Products Company, Des Plaines, Ill., a corporation of Delaware
Filed Sept. 28, 1961, Ser. No. 141,504
5 Claims. (Cl. 23—288)

The present invention is directed to an improved catalytic converter for use in the catalytic oxidation and conversion of exhaust gas streams and more particularly to a converter-muffler apparatus which incorporates partitioning means in conjunction with a catalyst bed therein to assist in obtaining a more rapid initiation of the catalytic oxidation reaction within the bed.

The desirability of removing or converting the noxious compounds of vehicular exhaust gases has been generally well established. Such exhaust gases contain one or more components as unburned hydrocarbons, carbon monoxide, nitrogen oxides, sulfur compounds, partially oxidized products, etc. in various concentrations, and part or all of these components contribute to the smog problem presently facing various geographical areas of the United States and other countries.

In order to overcome the problem of smog and of atmospheric contamination, it has been proposed to use "afterburners" or various catalytic devices in the exhaust gas system of a vehicle in order to overcome the contamination problem. In the catalytic operation, the hot gases issuing from the motor exhaust manifold are mixed with a quantity of secondary or combustion air and the resulting mixture passed through a catalyst bed maintained within a conversion zone so as to effect a more or less complete oxidation of the carbon monoxide and unburned hydrocarbons present in the exhaust stream. The use of a catalytic method and apparatus also provides for the initiation of the oxidation reaction at lower temperatures than might otherwise be possible, and effectively, eliminates the need for spark plugs or other igniting means which are necessary in most types of "afterburners," or other apparatus which depend strictly upon thermal conversion conditions.

A preferred form of exhaust gas conversion apparatus embodies a design and construction which provides for the internal placement or positioning of a catalyst bed such that it may be utilized in an efficient manner and to the maximum degree. It is not intended to limit the present invention to the use of any one type of catalyst since there are now improved catalyst compositions available which will retain their catalytic efficiency for long periods of operation. The catalyst is used in particle form, such as spheres, cylinders or pellets, and is disposed in a suitable perforate enclosure or retaining section providing for uniform gas flow therethrough without an undue pressure drop.

The present improved design feature is adapted for use with various types of catalytic converter apparatus which use a fixed bed of catalyst particles, regardless of the bed arrangement, or of the design of the housing or casing. The converter apparatus should, of course, be designed with respect to structural and mechanical details to withstand temperature stresses which may be induced by relatively large thermal gradients within different portions of the apparatus. High temperatures, substantially in excess of those encountered in conventional automobile mufflers, may be produced as a result of exothermic oxidation reactions taking place within the zone of the catalyst bed. Depending upon the particular catalytic material employed, as well as upon the operation of the particular vehicle, as to whether it is being operated under conditions of idle, acceleration, cruising, or deceleration, temperature variations may exist and the temperature may well run above 1200° F. and up to the order of 1800° F. It is generally desirable to have the construction of the various components in the converter of relatively light gauge sheet metal, for both alloy and non-alloy sections thereof, such that the weight of the converter will not be excessive and such that there may be expansion movements without effecting rupture or splitting of joints and seams. It is further desirable that the arrangement of the internal catalyst bed, or of a packing material, in a perforated retaining case be such that there is effected the substantially uniform distribution of the gas flow through an inlet manifold to the catalyst bed, as well as a desired acoustical muffling of the exhaust gas stream from the internal combustion engine without causing excessive back pressure on the exhaust manifold of the engine.

One of the handicaps encountered in the utilization of the catalytic converters for effecting the catalytic oxidation of automotive exhaust gases is the necessity for achieving a low ignition temperature. In other words when an automobile is started and used from a cold start, then for a period of from two to perhaps ten minutes, depending upon the manner of operating the automobile, the catalyst bed may remain relatively cool and be unable to burn the residual combustible components effectively within the converter, thus allowing such combustibles to escape through the tail-pipe to the atmosphere. It has been determined however, even at relatively low temperatures, in the 100° to 300° F. range, that some combustion occurs at the catalyst surface, but that the rate of flow of the cold gases is so rapid that the relatively small amount of heat of combustion liberated per unit of time is dissipated in the exhaust gas stream, thus minimizing heat storage by the catalyst particles and any temperature build-up in the bed. Only when the rate of evolution and heat by combustion exceeds the rate at which heat is carried off is it possible for the temperature of the catalyst bed to be raised, resulting in what is called "ignition," or combustion at a self-sustaining rate.

It is a principal object of the present invention to provide an improved catalytic conversion apparatus by incorporating suitable partitioning means in combination with the catalyst bed therein so to effect a lowering of the rate of the gas flow through at least a portion of the catalyst bed and thereby in turn effect a reduced ignition temperature in such portion and the initiation of a more rapid catalytic conversion of the entire exhaust gas stream throughout the remaining portion of the catalyst bed.

It is a further object of the present invention to provide a flared tubular form of partitioning means that is positioned and arranged to flare outwardly in the direction of gas flow, to thus effect a reduction in the gas stream velocity through such flared portion, or portions, and in turn effect lower ignition temperatures within the catalyst bed.

In a broad aspect, the present invention comprises the use of special partitioning means in combination with a substantially fixed bed of particles of oxidation catalyst within a catalytic converter having inlet means to distribute an exhaust gas stream substantially uniformly therethrough, there being provided at least one partitioning means positioned to partially separate at least one fractional portion of the particles of the catalyst bed from the principal bed, with such partitioning means having opposing wall segments positioned and arranged to flare outwardly and away from one another in the downstream direction of gas flow from an opening connective with the gas inlet means whereby the velocity of a portion of the gas stream is reduced as it passes through an increasing cross sectional area provided by the partitioning means, and at least a down stream end portion of said partitioning means is in juxta-position with at least a portion of said principal catalyst bed whereby there may be heat conduction and radiation from such end portion to the catalyst bed.

It is thus a feature of the present invention to provide a zone of reduced spaced velocity such that self-sustaining combustion and ignition of the exhaust gas stream may more readily take place, with heat being permitted to build up first on a separated portion of the catalyst and not carried away by high velocity gas flow. Also, the partitioning means must be, at least in part, in contact with the main catalyst bed in order to provide desirable heat transfer to the particles in the main portion of the bed. More than one partitioning means may also be utilized in any one converter in contact with the catalyst particles such that more than one "ignited" zone may be established to effect ignition and initiation of conversion throughout the main portion of the bed, as well as aid in sustaining catalytic combustion during periods of reduced inlet temperatures such as might occur with a prolonged engine idle. In other words the catalyst bed "flame-out" temperature will also be reduced, along with the "ignition" temperature.

In its simplest form, the partitioning means may comprise opposing wall segments which flare away from one another, or a flared tubular section which is of a conical or pyramidal shape, suitable gas inlet means to the interim zone between the wall segments that is connective with the inlet manifold of the converter such that a portion of the exhaust gas stream is deflected or channeled into such zone. The increasing cross sectional area zone as provided by the flared sections of the partitioning means will effect a reduced velocity for that portion of the stream contacting the particles confined between the wall segments and thus in turn preclude dissipation of the heat of combustion on the catalyst surface.

The improved design may be better explained, as well as further advantageous features set forth, by reference to the accompanying drawing and the following description thereof.

Referring now to the drawing, there is indicated diagrammatically one form of catalytic converter-muffler apparatus embodied within a casing or housing 1 which has an exhaust gas inlet 2 and treated gas outlet 3. Within the interior of the housing is a catalyst particle bed 4 retained between an upper perforate partitioning member 5 and lower perforate partitioning member 6. Each of the latter extends across the interior of the housing 1 at spaced distances from the top and bottom portions of the housing in a manner providing respectively an upper inlet manifold section 7 and a lower outlet manifold section 8.

As hereinbefore noted, it is not intended to limit the improved type of converter to any one particular type of oxidation catalyst inasmuch as there are various known effective and efficient catalyst compositions. Suitable oxidation catalysts include the metals of Groups I, V, VI, VII, and VIII of the Periodic Table, particularly copper, silver, vanadium, chromium, manganese, iron, cobalt, nickel and platinum. Thees components may be used singly, in combination of two or more, or may be composited with an inorganic refractory oxide such as alumina, silica-alumina, silica-alumina-zirconia, silica-thoria, silica-boria and the like.

In accordance with the present invention at least one tapering form of partitioning means is utilized in combination with the fixed catalyst bed 4 to effect a desired reduced space velocity through a portion of the catalyst particles. However, for purposes of illustration, three different partitioning means are indicated in the drawing to effect the passage of portions of the exhaust gas stream from the inlet manifold 7 to the interior of the catalyst bed 4. A flared partitioning section 9, which is of a frusto-conical shape, is indicated as being substantially entirely embedded within the catalyst section 4. There being provided a short small diameter tubular section 10 and a screen 11 at the upper end of the flared section in communication with inlet manifold 7. Thus, in the operation of the converter, a fractional portion of the exhaust gas stream is free to pass through screen 11 and short tubular section 10 into the increasing cross sectional area zone formed by the flaring wall of partitioning means 9 and that portion of the exhaust gas stream entering through inlet tube 10 will undergo a reduction in its flow rate as it progresses to the outlet end of the conical portion 9. The reduction in the velocity permits, as hereinbefore set forth, a build-up of the heat of combustion and lower temperature ignition of the combustible products in such zone, as compared with the ignition taking place in the adjoining principal portion of the catalyst bed 4. In other words, the catalyst is permitted to effectively initiate, or maintain, sustained catalytic combustion, without heat being dissipated into the rapidly flowing gas stream. The heat accumulation in the separate portion of catalyst may be gradually conducted through the wall of the conical section 9 to the main catalyst bed and in turn provide an overall more rapid activation and utilization of the entire converter-muffler in effecting the oxidation of the entire exhaust gas stream. Preferably, the conical section 9 will stop short of reaching the lower partitioning member 8 such that the exhaust gas stream from the interior of flared section 9 will flow directly into at least a portion of the principal catalyst bed downstream from the partitioning means. However, where desired, the flared partitioning means may be positioned and arranged to discharge into the upper portion of the main bed of catalyst, an important requirement being means for conducting heat from the separated catalyst particles to the main bed of particles.

Reference is made to flared section 12 which, like section 9, may be of a conical or pyramidal shape arranged to flare outwardly and downwardly to maintain a separated portion of catalyst particles 13. The latter are, in part, positioned above the main catalyst bed 4 within the flared section 12, as well as above the upper perforate retaining member 5 and within the inlet manifold section 7. For purposes of retaining catalyst particles 13, a screen member 14 is provided across the upper end portion of flared conical section 12 and a lower screen member 15 is provided across the lower end of section 12, although generally a lower screen member, such as 15, will be unnecessary where at least the end portion of the section is embedded within the main catalyst bed 4. Here again, that portion of the exhaust gas stream which enters the upper inlet end of the flared section 12 through screen 14, will undergo a reduced velocity as it passes downstream through the increasing cross sectional area provided by the flaring section 12 and through the confined catalyst bed 13 to ultimately discharge into the main bed 4. The reduced velocity again providing the lowering of the ignition temperature by virtue of a more rapid build-up of heat of combustion in the separated catalyst particles. Heat transfer, in this instance, is accomplished by the conduction and radiation of heat from the lower portion of the flared section 12, as well as by downward flow of the fractional portion of the exhaust gas stream undergoing catalytic oxidation within the separated catalyst bed 13.

Still another design and arrangement of partitioning means is indicated by the tubular section 16 embedded within catalyst bed 4, together with a flaring upper inlet section 17 which is positioned above the perforate plate 5 and within the inlet manifold section 7. The smaller inlet section 17 is designed and arranged to have the incoming exhaust gas stream pass through a perforate screenlike member 18 which extends across a substantially vertically positioned opening to inlet section 17. In a manner similar to the other embodiments, the lower end portion of section 16 terminates within the interior of the main catalyst bed 4 such that the resulting treated portion of the exhaust gas stream being discharged from the zone between the wall segments of sections 16 and 17, will in turn flow in a downstream direction into the principal catalyst bed, prior to being discharged through the lower perforate member 6 and outlet manifold section 8.

It is obvious that still other designs and arrangements may be provided to place partitioning means which will cause a fractional portion of the exhaust gas stream to effect a reduction in flow rate and space velocity within a segment of the catalyst bed, such that there is a desired more rapid storage of heat in a separated portion of the catalyst, or conversely, the retention of heat, where the gas inlet temperature becomes lowered by virtually a change in operation of the engine providing the exhaust stream. Also, it is not intended to limit the partitioning means providing the improved operation for use in connection with any one type of catalyst bed. The present embodiment indicates the use of a substantially flat disc-like bed of catalyst 4, however, fixed beds of catalyst may, for example, be retained in a cylindrical form, or in annular-shaped beds, etc., where the exhaust gas stream passes in radial flow through such beds, and in such cases the flared partitioning means may still be utilized in combination therewith to effect the desired reduced space velocity through at least a portion of the particles. It is contemplated that the flared partitioning means will generally be constructed of a light gauge metal capable of effecting a rapid heat transfer from the interior of the confining section to the main catalyst bed surrounding such section. Also, such metal is generally of a heat resistant alloy capable of withstanding the heat conditions encountered in catalytic converter-mufflers of this type.

The following examples will serve to illustrate the definite effect which is obtained by reducing space velocity through a partitioned section of catalyst so as to preclude the dissipation of heat of combustion as it is liberated by the catalytic effect of the catalyst, and in turn effect a lowering of ignition temperatures.

Example I

A catalyst with 0.1% platinum content was prepared by impregnating alumina spheres of approximately 1/16" average diameter, with such spheres having previously been prepared by dropping and drying an aluminum chloride hydrosol. The impregnation of the spheres was carried out with chloroplatinic acid to provide the desired resulting composite with 0.1% platinum by weight after drying and calcination in the presence of air.

To evaluate the effectiveness of the catalyst as an oxidation catalyst for the conversion of an auto exhaust stream, approximately 440 cc. of the catalyst particles were placed on a supporting screen within a cylindrical converter chamber, having an inside diameter of about 4 inches. This chamber is serially connected to an engine exhaust pipe such that the gases are caused to pass directly through the bed of catalyst to an outlet line. The 440 cc. quantity provides a catalyst bed depth of approximately 3 inches. A second screen is placed above the catalyst particles as a retaining screen and to separate a layer of 1/4" ceramic balls which are employed to effect an even distribution of the exhaust gas stream down through the catalyst particles.

In this particular test operation, a commercial premium-grade fuel was used in the test engine and the resulting catalytically treated gas stream is analyzed in a Liston-Becker infra-red ABE detector. The degree of "carbon monoxide conversion" referred to hereinafter shows the extent of actual oxidation of carbon monoxide to carbon dioxide and in general parallels rather closely, but usually to a lower percentage, the extent of hydrocarbon conversion taking place in the contacting of the catalyst bed.

In actual test run, following the engine startup, the inlet temperature of the exhaust gas to the bed was measured at successive intervals in correlation with various states of carbon monoxide conversion being effected by the catalyst bed. Such temperature readings are as follows:

|  | Carbon monoxide conversion, percent | | |
| --- | --- | --- | --- |
|  | 10 | 50 | 70 |
| Inlet temperature, °F | 640 | 670 | 710 |

Example II

Using the same catalyst and the same test apparatus described in Example I, a modification was made at the upper inlet end of the catalyst bed, by partially embedding a frustro-conical tubular member in the top portion of such bed of particles. The flaring tubular member had a 1" upper diameter, a 2" lower or base diameter, and a 1¾" height, and was embedded for approximately one-half its height. The upper protruding portion of the member was also filled with catalyst particles such that the portion of the exhaust gas stream entering the interior of the downwardly flaring member would be in contact with catalyst. The reduction in the space velocity resulting from the flow through the flaring passageway is proportional to the square of the inlet and outlet diameter of the member, and therefore, is reduced to approximately 25% of that existing in the adjacent principal bed.

In an actual test run carried out in the modified converter chamber in a manner similar to that conducted for Example I, the following inlet temperature readings were recorded for the respective stages of carbon monoxide conversion.

|  | Carbon monoxide conversion, percent | | |
| --- | --- | --- | --- |
|  | 10 | 50 | 70 |
| Inlet temperature, °F | 530 | 580 | 630 |

By comparing the results from the tests of Example I and Example II, it is evident that the flaring partitioning device providing a reduction in velocity for that portion of the exhaust gas stream passing therethrough is effective in sustaining hydrocarbon and carbon monoxide conversion in the catalyst bed at definitely lower temperature levels. Such reduced temperature levels being 110° F., 90° F., and 80° F., for respectively the 10%, 50% and 70% conversion levels.

I claim as my invention:

1. A catalytic conversion apparatus comprising a housing, a pair of spaced perforated partitions dividing the housing into a catalyst retaining section between the partitions and inlet and outlet manifold sections on opposite sides of the catalyst section, a bed of catalyst particles in said retaining section, means for introducing a gas stream to the inlet manifold section to flow through the catalyst section and the bed therein to said outlet section, means for removing gases from the outlet manifold section, and means for lowering the rate of gas flow through a portion of the catalyst bed in the catalyst section comprising an open-ended member of circular cross-section extending through one of said partitions said member having a portion thereof embedded in said catalyst bed and having one of its open ends disposed in said inlet manifold section and its other open end disposed within the catalyst bed in said catalyst section, said open end in the inlet manifold section being of smaller cross-sectional area than said other open end in the catalyst section.

2. The apparatus of claim 1 further characterized in that said open-ended member comprises an increasing cross-sectional area tubular section of a thin metallic heat conduction material.

3. A catalytic conversion apparatus comprising a housing, a pair of spaced perforated partitions dividing the housing into a catalyst retaining section between the partitions and inlet and outlet manifold sections on opposite sides of the catalyst section, a bed of catalyst particles in said retaining section, means for introducing a gas stream to the inlet manifold section to flow through the catalyst section and the bed therein to said outlet section, means for removing gases from the outlet manifold section, and means for lowering the rate of gas flow through a portion of the catalyst bed in the catalyst section comprising an open-ended frustro-conical member embedded in the catalyst bed in said catalyst section and a tubular member extending from the smaller end of the frustro-conical member through one of said partitions into the inlet manifold section.

4. A catalytic conversion apparatus comprising a housing, a pair of spaced perforated partitions dividing the housing into a catalyst retaining section between the partitions and inlet and outlet manifold sections on opposite sides of the catalyst section, a bed of catalyst particles in said retaining section, means for introducing a gas stream to the inlet manifold section to flow through the catalyst section and the bed therein to said outlet section, means for removing gases from the outlet manifold section, and means for lowering the rate of gas flow through a portion of the catalyst bed in the catalyst section comprising an open-ended frustro-conical member extending through one of said partitions and having its smaller open end disposed in said inlet manifold section and its larger open end embedded in the catalyst bed in said catalyst section.

5. The apparatus of claim 1 further characterized in that the portion of said open-ended member disposed in the catalyst section is tubular in shape and is provided with a flaring inlet section extending into said inlet manifold section, the open end of said member in the inlet manifold section being of smaller cross-sectional area than the open end of the tubular portion in the catalyst section and said inlet section being flared toward said means for introducing a gas stream.

References Cited in the file of this patent

UNITED STATES PATENTS

| | | |
|---|---|---|
| 2,077,563 | Henry | Apr. 20, 1937 |
| 2,150,768 | Hedrick | Mar. 14, 1939 |
| 2,772,147 | Bowen et al. | Nov. 27, 1956 |